United States Patent
Barajas Gonzalez et al.

(10) Patent No.: US 10,528,258 B2
(45) Date of Patent: Jan. 7, 2020

(54) DETERMINATION OF REDUNDANT ARRAY OF INDEPENDENT DISK LEVEL FOR STORAGE OF DATASETS

(71) Applicant: INTERNATIONAL BUSINESS MACHINES CORPORATION, Armonk, NY (US)

(72) Inventors: Emmanuel Barajas Gonzalez, Guadalajara (MX); Shaun E. Harrington, Sahuarita, AZ (US); Gary Anna, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/908,114

(22) Filed: Feb. 28, 2018

(65) Prior Publication Data

US 2019/0265890 A1    Aug. 29, 2019

(51) Int. Cl.
*G06F 3/06* (2006.01)
*G06K 9/62* (2006.01)
*G06N 20/00* (2019.01)

(52) U.S. Cl.
CPC .......... *G06F 3/0604* (2013.01); *G06F 3/0614* (2013.01); *G06F 3/0647* (2013.01); *G06F 3/0659* (2013.01); *G06F 3/0689* (2013.01); *G06K 9/6278* (2013.01); *G06N 20/00* (2019.01)

(58) Field of Classification Search
CPC .... G06F 3/0604; G06F 3/0689; G06F 3/0614; G06F 3/0647; G06F 3/0659; G06N 20/00; G06K 9/6278
See application file for complete search history.

(56) References Cited

U.S. PATENT DOCUMENTS

| | | | |
|---|---|---|---|
| 7,334,156 | B2 | 2/2008 | Land et al. |
| 8,762,583 | B1* | 6/2014 | Faibish ................ G06F 3/0605 706/20 |
| 8,924,328 | B1 | 12/2014 | Kozlovsky et al. |
| 9,286,173 | B2 | 3/2016 | Nolterieke et al. |
| 9,600,181 | B2 | 3/2017 | Patel et al. |
| 2005/0120058 | A1* | 6/2005 | Nishio ................. G06F 16/185 |
| 2012/0260037 | A1* | 10/2012 | Jibbe .................. G06F 11/1076 711/114 |
| 2016/0335435 | A1* | 11/2016 | Schmidtler .......... G06F 21/565 |

OTHER PUBLICATIONS

Liu, Yan, et al., "Ess: A New Storage Architecture for Mid/Large Raid," IEEE, 2006 International Conference on Machine Learning and Cybernetics, pp. 940-947, 2006.
"Naive Bayes Classifier", Wikipedia, [online][retrieved Feb. 16, 2016] https://en.wikipedia.org/wiki/Naive_Bayes_classifier.

* cited by examiner

*Primary Examiner* — David Yi
*Assistant Examiner* — Zubair Ahmed
(74) *Attorney, Agent, or Firm* — Rabindranath Dutta; Konrad Raynes Davda & Victor LLP

(57) ABSTRACT

A storage controller receives a write command from a host computational device to write a dataset. A learning application maps the dataset into a Redundant Array of Independent Disk (RAID) level by classifying the dataset into a category of a plurality of categories, wherein the plurality of categories correspond to a plurality of RAID levels. A storage management application writes the dataset to a RAID array that corresponds to the RAID level determined by the learning application.

20 Claims, 11 Drawing Sheets

DETERMINATION OF REDUNDANT ARRAY OF INDEPENDENT DISK LEVEL FOR STORAGE OF DATASETS

BACKGROUND

1. Field

Embodiments relate to the determination of Redundant Array of Independent Disk (RAID) level for storage of datasets.

2. Background

In certain computing environments, a computational device such as a storage controller may control access to storage for one or more host computational devices that may be coupled to the storage controller over a network. A storage management application that executes in the storage controller may manage a plurality of storage devices, such as disk drives, tape drives, flash drives, direct access storage devices (DASD), etc., that are coupled to the storage controller. A host computational device may send Input/Output (I/O) commands to the storage controller and the storage controller may execute the I/O commands to read data from the storage devices or write data to the storage devices.

Data is stored in physical storage volumes of storage devices. Logical storage volumes are generated by the storage controller to maintain the data stored in the physical storage volumes. Each logical storage volume may logically represent data stored in one or more physical storage volumes. Data is physically stored in the physical storage volumes and logically represented in the logical storage volumes. The storage controller manages and controls access to the logical and physical storage volumes.

Redundant Array of Independent Disks (RAID) is a data storage virtualization technology that combines multiple physical disk drives into one or more logical units (e.g., logical storage volumes) for achieving data redundancy or performance improvement or both. Data may be distributed across the disk drives in one of many ways depending on the required level of redundancy and performance. The different schemes, or data distribution layouts, are referred to by the word "RAID" followed by a number, for example RAID 0, RAID 1, RAID 3, RAID 4, RAID 5, RAID 6, RAID 10, etc. Each RAID level provides a different balance among the key goals: reliability, availability, performance, and capacity. RAID levels greater than RAID 0 provide protection against unrecoverable sector read errors, as well as against failures of whole physical drives.

A storage controller may configure disks controlled by the storage controller into one or more RAID arrays. For example, a storage controller may configure a plurality of disks to form a first set of RAID arrays corresponding to a RAID 0 level, a second set of RAID arrays corresponding to a RAID 1 level, and a third set of RAID arrays corresponding to a RAID 5 level, etc.

SUMMARY OF THE PREFERRED EMBODIMENTS

Provided are a method, a system, a computer program product in which a storage controller receives a write command from a host computational device to write a dataset. A learning application maps the dataset into a Redundant Array of Independent Disk (RAID) level by classifying the dataset into a category of a plurality of categories, wherein the plurality of categories correspond to a plurality of RAID levels. A storage management application writes the dataset to a RAID array that corresponds to the RAID level determined by the learning application. As a result, datasets are stored with an appropriate level of fault tolerance.

In additional embodiments the learning application performs operations comprising: performing a training phase to adjust parameters in the learning application by processing a plurality of training datasets provided for the training phase, wherein the plurality of training datasets provided for the training phase indicate mappings of the plurality of training datasets into a plurality of RAID levels; and improving classification of datasets while processing newly arriving datasets to map the newly arriving datasets to RAID levels. As a result, continuous improvements take place in the learning application.

In further embodiments, a tiering application that executes in the storage controller moves one or more datasets from one storage tier to another storage tier. As a result, datasets are stored in the appropriate storage tier.

In yet further embodiments, the learning application interfaces with the tiering application to adjust the classification of datasets, in response to the tiering application moving one or more datasets from one storage tier to another storage tier. As a result, incorrect classifications of datasets are reduced over time in the learning application.

In additional embodiments, the mapping of the dataset into the RAID level is based at on fault tolerance requirements and performance requirements of the dataset. As a result, fault tolerance is achieved along with adequate performance.

In further embodiments, the learning application performs a Bayesian classification of datasets based on indications corresponding to an initiator, a block size, and a timestamp for each dataset. As a result, multiple features of the datasets are used to improve the learning application.

In certain embodiments, a first dataset that requires a higher level of fault tolerance than a second dataset is mapped into a RAID level that provides a higher level of fault tolerance in comparison to a RAID level to which the second dataset is mapped into. As a result, datasets that are critical to a user are stored in RAID arrays with a higher fault tolerance in comparison to datasets that are not critical to the user.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

In certain RAID architectures, datasets comprising any type of collection of data are stored with a fixed RAID configuration for a single array. Different RAID configurations provide different levels of protection. For example, a RAID 5 array with two simultaneous disk failures may experience data loss. With a RAID 6 array, three disk failures may cause a data loss. All the datasets that are stored in a RAID array have the same fault tolerance. If there are different datasets that have to be stored with different fault tolerance levels, then different RAID arrays may be utilized for different fault tolerance levels.

Certain embodiments describe mechanisms for utilizing machine learning in conjunction with RAID array technology to allow for a determination to be made of the RAID level of the RAID array to which a dataset should be written, based on the fault tolerance level desired for the dataset. By categorizing the datasets based upon its determined fault tolerance level, the "best-fit" RAID level may be determined before the writing of the datasets occur. This may allow users to take advantage of multiple RAID levels in a RAID system. For instance, critical datasets may be classified and written as RAID 6 while less critical datasets may be written as RAID 5. It may also be possible to have a dataset that is not critical at all to be written as RAID 0 (striped only) across a RAID array with no fault tolerance. This reduces the number of RAID arrays that are needed to store data with different fault tolerance levels. Certain embodiments improve the machine learning mechanisms by incorporating information provided by a tiering application on data movement operations between storage tiers.

Machine learning mechanism are used to categorize a newly arriving dataset based upon the "value" of the dataset and a corresponding RAID level is determined for the dataset. Then during a write operation, the storage controller writes the dataset to a RAID array corresponding to the determined RAID level.

Certain embodiments provide a machine learning based selection of RAID level to store datasets, where the learning period is relatively short. Existing RAID level selections for datasets are examined for the source host, features used, block size, and timestamp of the dataset, etc., to map subsequently arriving datasets to appropriate RAID levels.

Exemplary Embodiments

Figure 1:
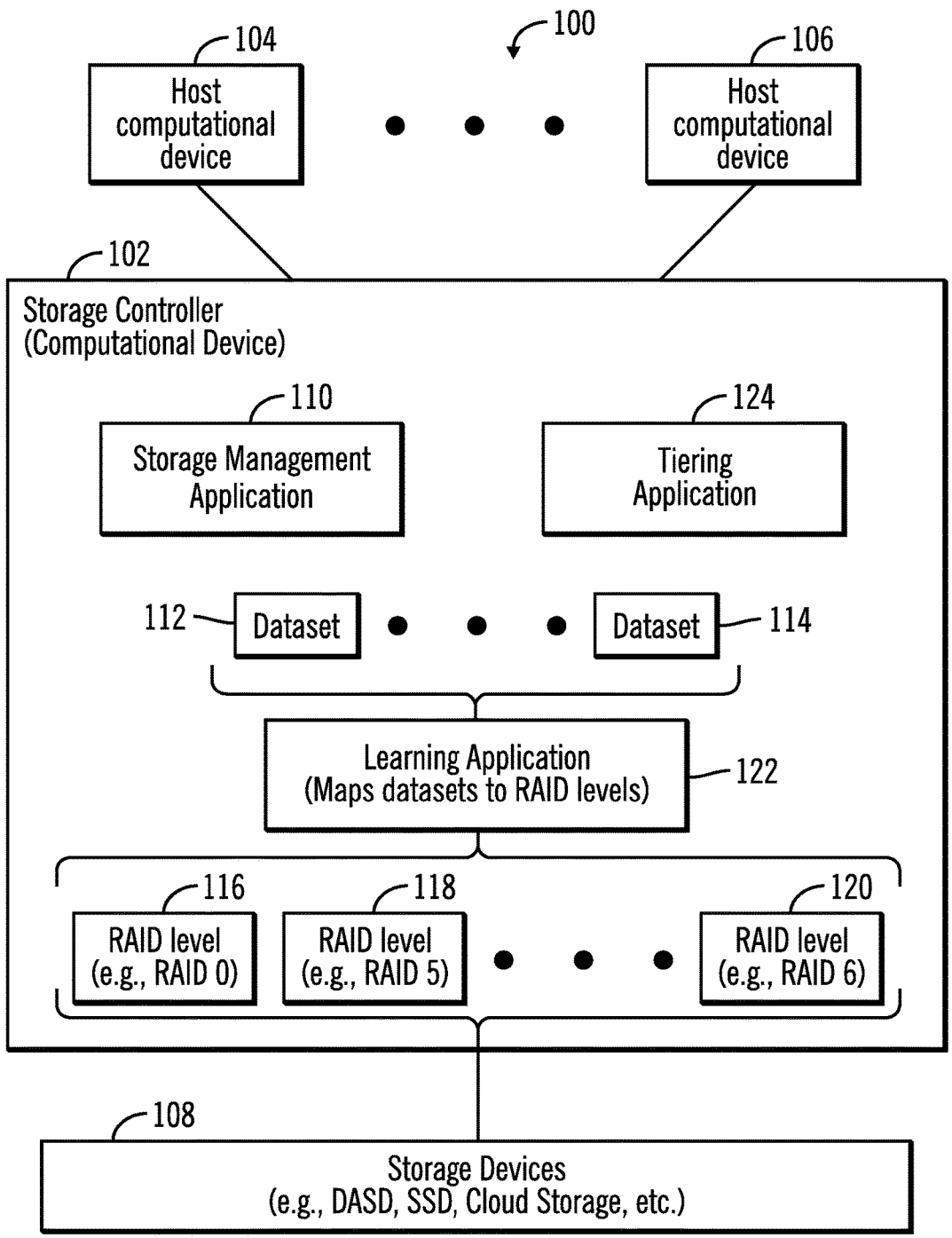
FIG. 1 illustrates a block diagram of a computing environment comprising a storage controller communicatively coupled to a plurality of host computational devices and a plurality of storage devices, in accordance with certain embodiments.

FIG. 1 illustrates a block diagram of a computing environment 100 comprising a storage controller 102 with a one or more central processing units (CPUs) communicatively coupled to a plurality of host computational devices 104, 106 and a plurality of storage devices 108, in accordance with certain embodiments/

The storage controller 102 and the host computational devices 104, 106 may comprise any suitable computational device including those presently known in the art, such as, a personal computer, a workstation, a server, a mainframe, a hand held computer, a palm top computer, a telephony device, a network appliance, a blade computer, a processing device, a controller, etc. The storage controller 102 may be comprised of a plurality of servers (not shown) that may provide redundancy because if one server undergoes a failure from which recovery is not possible, an alternate server may perform the functions of the server that failed. Each of the plurality of servers may be referred to as a processing complex or a central electronics complex (CEC) and may include one or more processors and/or processor cores. The storage controller 102 may also be referred to as a dual-server storage system.

The storage devices 108 controlled by the storage controller 102 may comprise DASD, solid state drives (SSD) or any other type of suitable storage device. Some or all of the storage devices 108 may be maintained in a cloud storage.

The storage controller 102, the host computational devices 104, 106, and the storage devices 108 may be elements in any suitable network, such as, a storage area network, a wide area network, the Internet, an intranet. In certain embodiments, the storage controller 102, the host computational devices 104, 106, and the storage devices 108 may be elements in a cloud computing environment.

A storage management application 110 executes in the storage controller 102. The storage management application 110 manages and controls Input/Output (I/O) access to storage volumes corresponding to the storage devices 108. In certain embodiments, the storage management application 110 may be implemented in software, hardware, firmware of any combination thereof.

In certain embodiments a plurality of datasets 112, 114 may be received by the storage controller 102 for writing to the storage devices 108. The datasets 112, 114 may comprise any collection of data and may be in the form of data records or any other suitable data structure.

The storage controller 102 may have configured the storage devices 108 into a plurality of RAID arrays, where each RAID array is of a particular RAID level. For example, in FIG. 1, a plurality of RAID levels 116, 118, 120 are shown, where RAID level 116 may be RAID 0, RAID level 118 may be RAID 5, and RAID level 120 may be RAID 6.

A learning application 122 that executes in the storage controller maps each of the datasets 112, 114 to one RAID level of the plurality of RAID levels 116, 118, 120 based on machine learning mechanisms. For example, based on the fault tolerance needs of dataset 112, the dataset 112 may be classified for storage on RAID arrays of RAID level 5 (shown via reference numeral 118). Machine learning mechanisms employed by the learning application 122 to map the datasets to RAID levels may infer a function from labeled training data. The training data may be comprised of a set of training examples. Each training example may be a pair that is comprised of an input object and a desired output value. A learning mechanism may analyze the training data and produce an inferred function, which may be used for mapping new examples. An optimal scenario may allow for the learning mechanism to correctly determine the class labels for unseen instances.

This requires the learning mechanism to generalize from the training data to unseen situations. In machine learning, Bayes classifiers are a family of simple probabilistic classifiers based on applying Bayes' theorem with strong (naive) independence assumptions between the features, and the learning mechanism used by the learning application 122 may use a Bayesian classifier. Other types of learning mechanisms may also be used by the learning application 122.

A tiering application 124 may also execute concurrently with the learning application 122 and the storage management application 110 in the storage controller 102. The tiering application 124 may move datasets from one storage tier (e.g., comprised of disk drives) to another storage tier (e.g. comprised of solid state drives), where the storage tiers may have been configured by the storage management application 110. The information provided by the movement of datasets by the tiering application 124 is used by the learning application 122 to improve the classification of subsequently arriving datasets at the storage controller 102. In certain embodiments, the storage management application 110, the tiering application 124, and the learning application 122 may be implemented in software, firmware, hardware or any combination thereof. The functions performed by the storage management application 110, the tiering application 124, and the learning application 122 may be integrated in one or more applications. For example, in certain embodiments a single application may perform the functions performed by the storage management application 110, the tiering application 124, and the learning application 122.

Therefore, FIG. 1 illustrates computing environment in which a learning application 122 uses learning mechanisms to classify a newly received dataset into one of a plurality of categories, where each category is a RAID level. The storage management application stores the newly received dataset in a RAID array corresponding to the RAID level into which the newly received database has been classified into.

Figure 2:
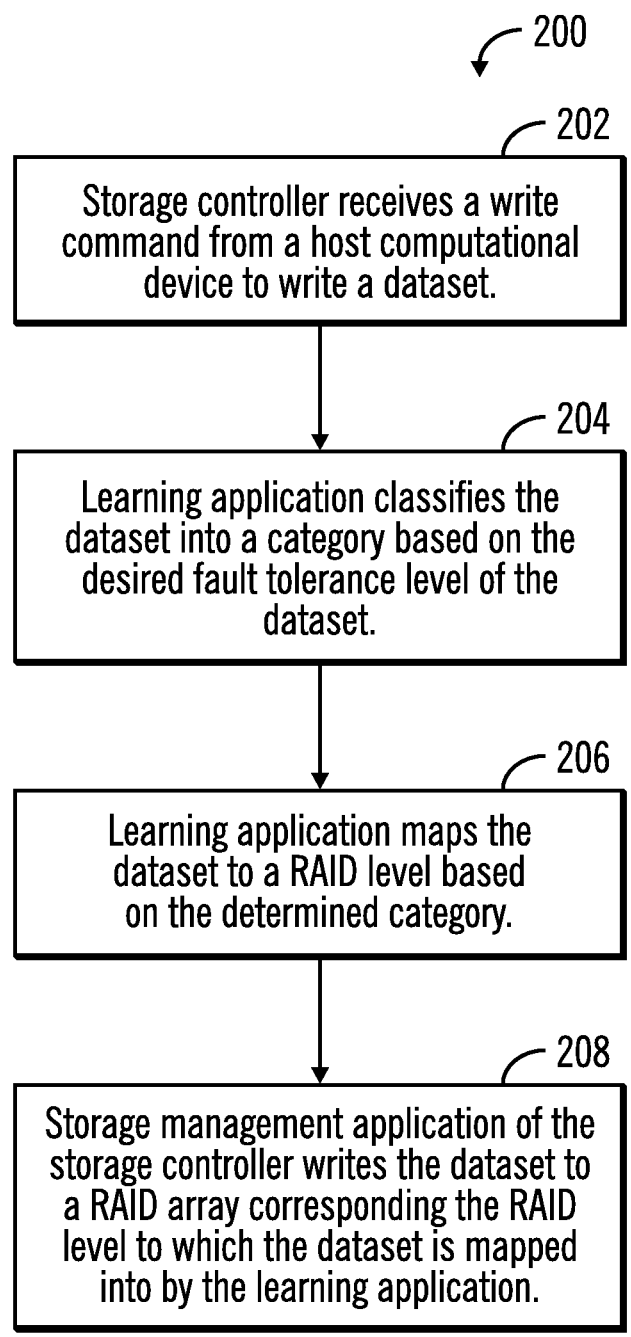
FIG. 2 illustrates a flowchart that shows operations performed by a learning application to map a dataset to a RAID level based on the desired fault tolerance level of the dataset, in accordance with certain embodiments.

FIG. 2 illustrates a flowchart 200 that shows operations performed by a learning application 122 to map a dataset to a RAID level based on the desired fault tolerance level of the dataset, in accordance with certain embodiments. The operations shown in FIG. 2 may be performed in the storage controller 102.

Control starts at block 202 in which the storage controller 102 receives a write command from a host computational device 104 to write a dataset 112. The learning application 122 may have already been trained for classifying newly received datasets via training datasets and via previously classified datasets. The dataset classification is based on the fault tolerance level of each dataset. The classification into categories may be performed by Bayesian estimation or some other learning mechanism.

From block 202 control proceeds to block 204 in which the learning application 122 classifies the dataset 112 into a category based on the desired fault tolerance level of the dataset 112. The learning application 122 then maps (at block 206) the dataset to a RAID level 116 based on the determined category.

From block 206 control proceeds to block 208 in which the storage management application 110 of the storage controller 102 writes the dataset 112 to a RAID array corresponding the RAID level 116 to which the dataset is mapped into by the learning application.

Therefore, FIG. 2 illustrates certain embodiments that writes a dataset to a RAID array of a RAID level that is commensurate with the fault tolerance expectations for the dataset.

Figure 3:
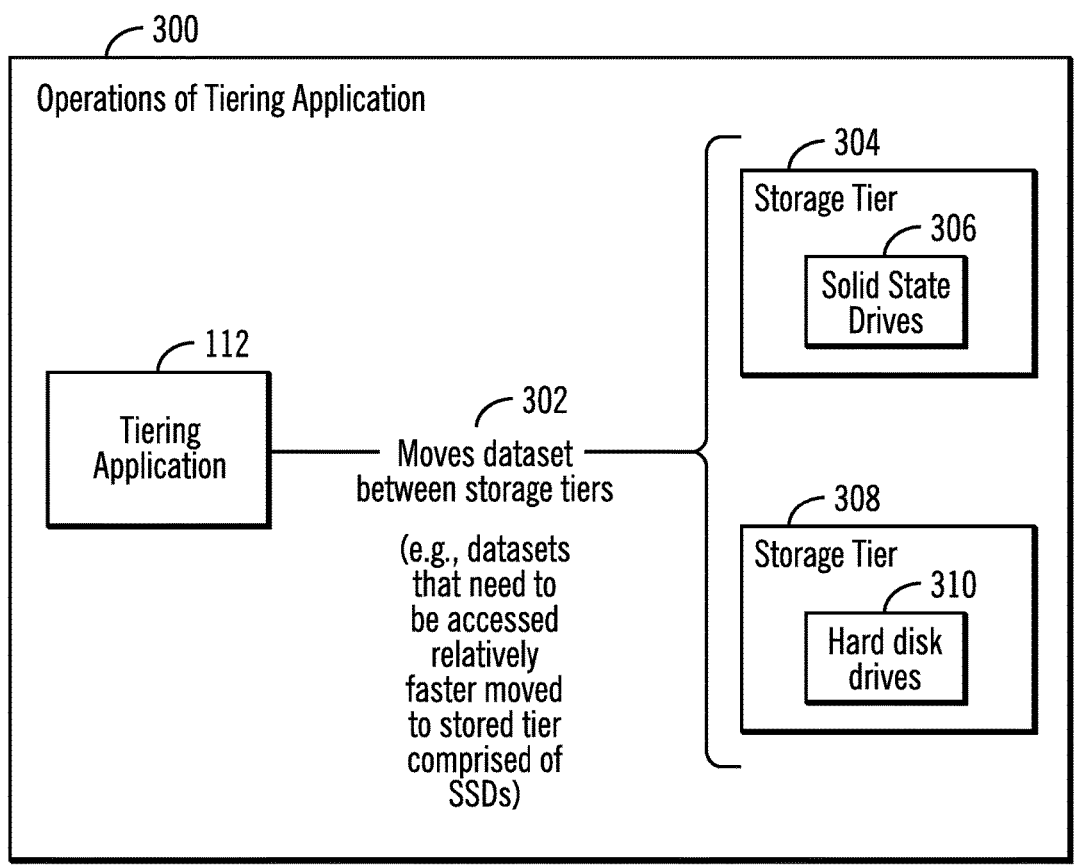
FIG. 3 illustrates a block diagram that shows operations performed by a tiering application, in accordance with certain embodiments.

FIG. 3 illustrates a block diagram 300 that shows operations performed by a tiering application 124, in accordance with certain embodiments. The operations shown in FIG. 3 may be performed in the storage controller 102.

The tiering application 124 may move a dataset between storage tiers (as shown via reference numeral 302). A storage tier is a collection of storage devices. For example, storage tier 304 may be comprised of solid state drives 306, and storage tier 308 may be comprised of hard disk drives 310 (i.e., storage tier 304 provides faster data access in comparison to storage tier 308 as solid state drives 306 provide better performance for I/O in comparison to hard disk drives 310). The configuration of storage devices 108 into storage tiers 304, 308 may be performed by the storage management application 110, and the tiering application 124 may maintain the storage tiers 304, 308.

It is possible that the learning application 122 may have misclassified a dataset to map the dataset to an improper RAID level, and this may become apparent when the tiering application 124 moves the dataset from one storage tier to another and overrides the classification made by the learning application 122. The learning application 122 improves the learning mechanisms to improve the classification of newly arriving datasets based on the movement of previously classified datasets, where the movement is performed by the tiering application 124.

For example, in certain embodiments a dataset may need fast access, and such a dataset may be moved from storage tier 308 comprising hard disk drives 310 to storage tier 304 comprising solid state drives 306 (as shown via reference numeral 302). This information on the dataset is used by learning mechanisms employed by the learning application 122 to classify subsequently arriving datasets.

Figure 4:
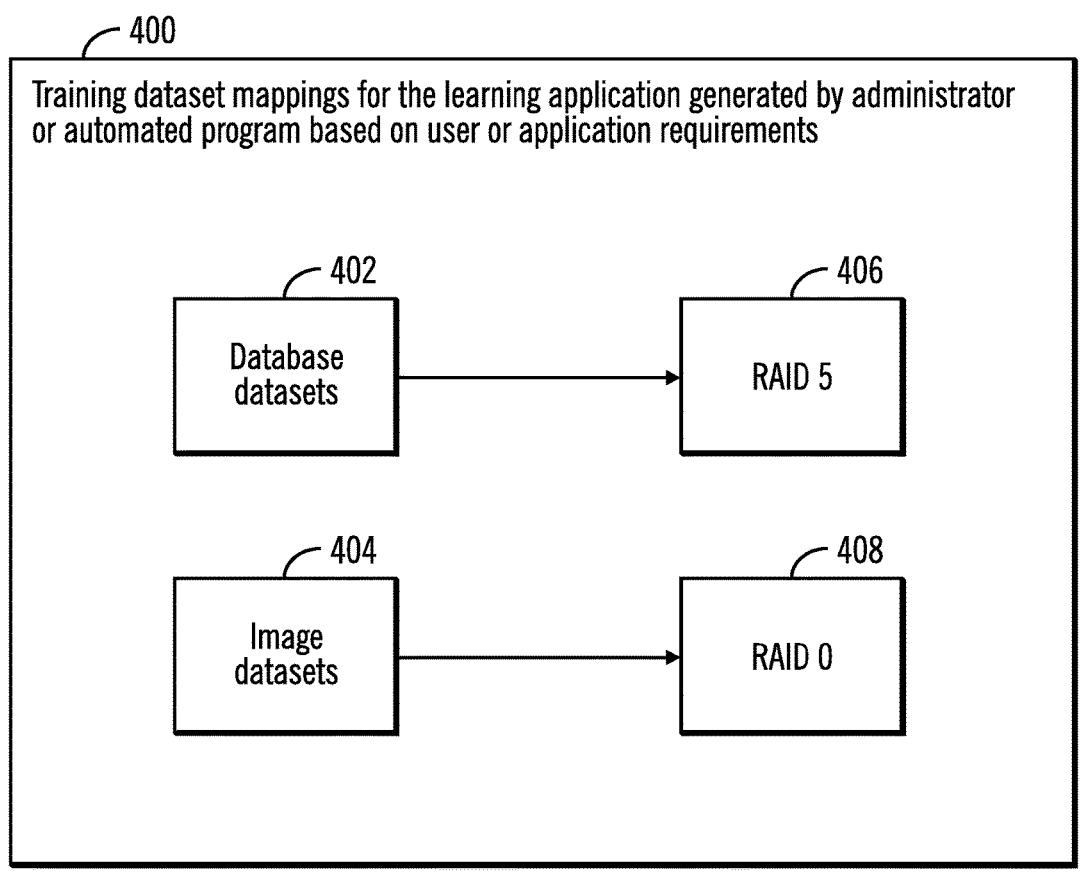
FIG. 4 illustrates a block diagram that shows training dataset mappings for the learning application generated by an administrator or an automated program based on user or application requirements, in accordance with certain embodiments.

FIG. 4 illustrates a block diagram 400 that shows training dataset mappings for the learning application generated by administrator or automated program based on user or application requirements, in accordance with certain embodiments.

The training datasets may comprise many different types of datasets and in FIG. 4 database datasets 402 and image datasets 404 are shown. The training datasets are preassigned to particular RAID levels. The database datasets 402 are shown being mapped to RAID 5 level as they require a significant level of redundancy and the image datasets 404 are mapped to RAID 0 level 408 as they require little or no redundancy. The training datasets are used to teach the learning mechanism of the learning application 122 on how to classify subsequently arriving datasets.

Figure 5:
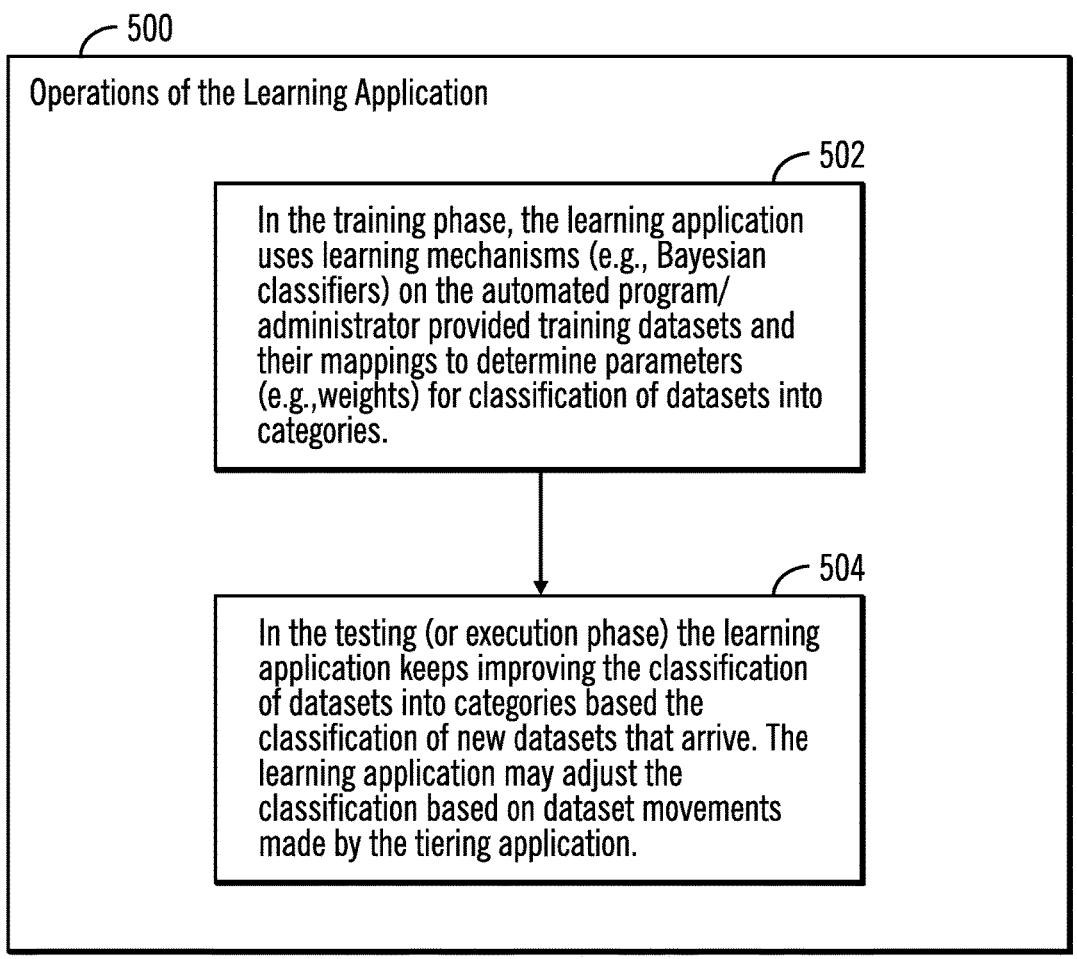
FIG. 5 illustrates a flowchart that shows operations performed by the learning application in a training phase and in a testing phase, in accordance with certain embodiments.

FIG. 5 illustrates a flowchart 500 that shows operations performed by the learning application 122 in a training phase and in a testing phase, in accordance with certain embodiments. The operations shown in FIG. 5 may be performed in the storage controller 102.

Control starts at block 502, where in the training phase, the learning application 122 uses learning mechanisms (e.g. Bayesian classifiers) on the automated program/administrator provided training datasets 402, 404 and their mappings to determine parameters (e.g., weights) for classification of datasets into categories.

From block 502 control proceeds to block 504 in which in the testing (or execution phase) the learning application 122 keeps improving the classification of datasets into categories based on the classification of new datasets that arrive. The learning application 122 may also adjust the classification based on dataset movements made by the tiering application 124.

Figure 6:
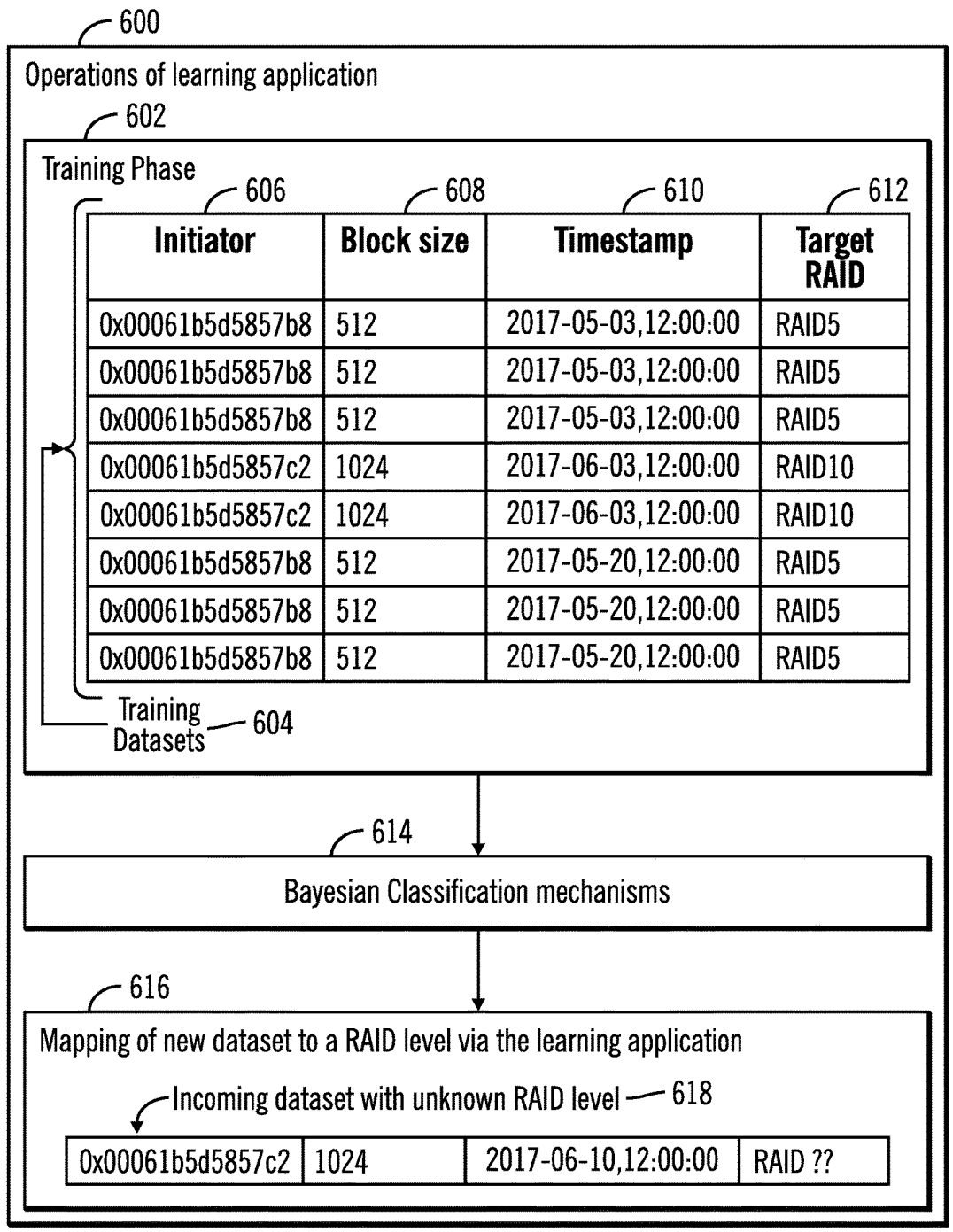
FIG. 6 illustrates a block diagram that shows operations performed by the learning application to classify a set of data having an initiator indication, a timestamp indication and a block size, in accordance with certain embodiments.

FIG. 6 illustrates a block diagram 600 that shows operations performed by the learning application 122 to classify a dataset having an initiator indication, a block size indication, and a timestamp indication, in accordance with certain embodiments. The operations shown in FIG. 6 may be performed in the storage controller 102.

In the training phase 602 a user or an automated program specifies the RAID level to which each dataset of a set of training datasets 604 should be mapped into. The learning application 122 collects the statistics (e.g., based on initiator 606, block size 608, timestamp 610) of each training dataset and adds the appropriate level (i.e., target RAID level 612) based on the information provided in the training datasets. The initiator indication 606 indicates the host computational device or application from which the request to write the dataset came from. The block size indication 608 indicates the size in blocks of the dataset. The timestamp indication 610 is an indication of the time at which the dataset was generated.

Whenever a new dataset arrives at the storage controller 102, the learning mechanisms of the learning application will try to classify the new dataset to determine where the dataset should be written. In order to do that Bayesian classification mechanisms (shown via reference numeral 614) are used. In the Bayesian classification mechanisms, a Bayesian classifier is used to perform calculations to classify the new dataset. For example, in certain embodiments the probability of the target RAID being RAID 5 is equal to the multiplication of the probabilities of RAID 5 multiplied by the probability of the incoming initiator given that RAID 5 has happened, multiplied by the probability of the block size being obtained given that RAID 5 has happened, multiplied by the probability of the timestamp given that RAID 5 has happened, and so on, in conformance with Bayesian classification. In other words, for each possible category, the learning application 122 calculates the probability of that category happening and the probability of every single feature given that the current category has happened.

Finally in block 616 the learning application 122 compares all the probabilities obtained (one per category) and selects the largest one to become the destination RAID for the incoming stream of data, when an incoming dataset 618 with an unknown RAID level arrives.

FIG. 6, shows a Bayesian classifier being used for learning. The Bayesian classifier may be used because it can keep learning and adjusting itself without introducing long offline times. This classifier works by calculating the possibility of the occurrence of a certain event (a RAID classification) given that a set of known events have occurred in the past.

In alternative embodiments other types of learning mechanisms may be used.

Figure 7:
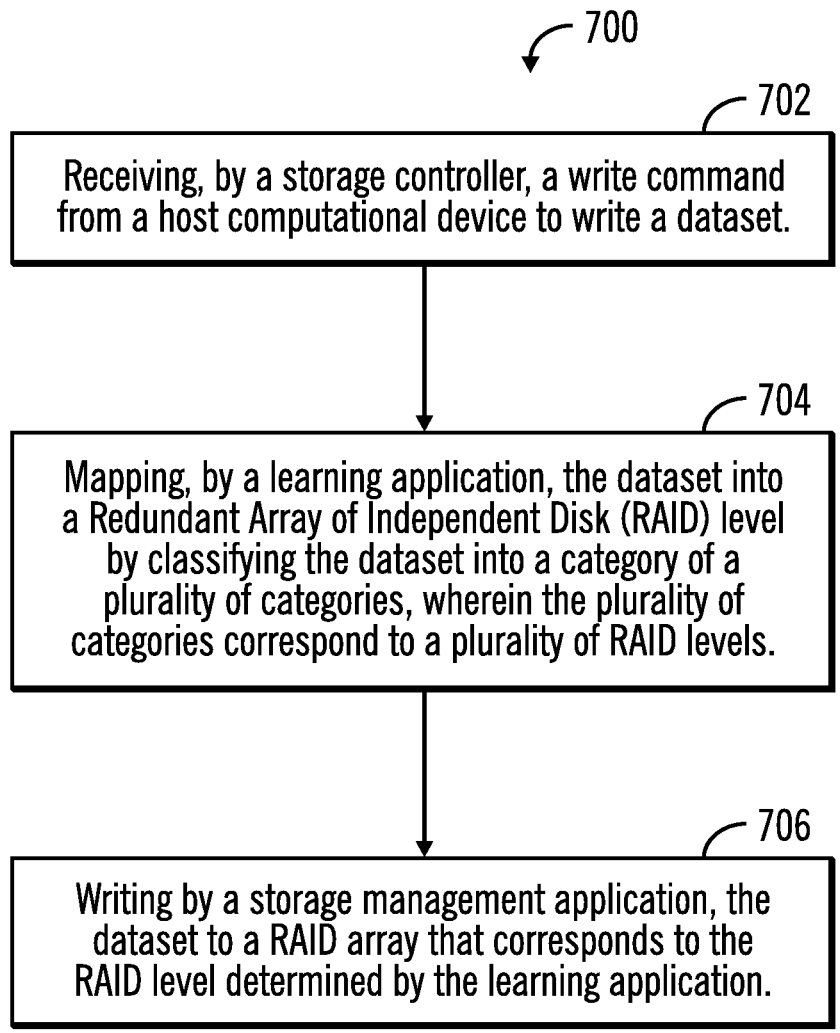
FIG. 7 illustrates a flowchart that shows operations for the determination of RAID level for the storage of datasets, in accordance with certain embodiments.

FIG. 7 illustrates a flowchart 700 that shows operations for the determination of RAID level for the storage of datasets, in accordance with certain embodiments. The operations shown in FIG. 7 may be performed in the storage controller 102.

Control starts at block 702 in which a storage controller 102 receives a write command from a host computational device 104 to write a dataset 112. A learning application 122 maps (at block 704) the dataset 112 into a Redundant Array of Independent Disk (RAID) level 118 by classifying the dataset 112 into a category of a plurality of categories, where the plurality of categories correspond to a plurality of RAID levels 116, 118, 120.

From block 704 control proceeds to block 706 in which a storage management application 110 writes the dataset 112 to a RAID array that corresponds to the RAID level 118 determined by the learning application (i.e., the RAID array formed from selected storage devices of the storage devices 108 is of the RAID level shown via reference numeral 118).

Figure 8:
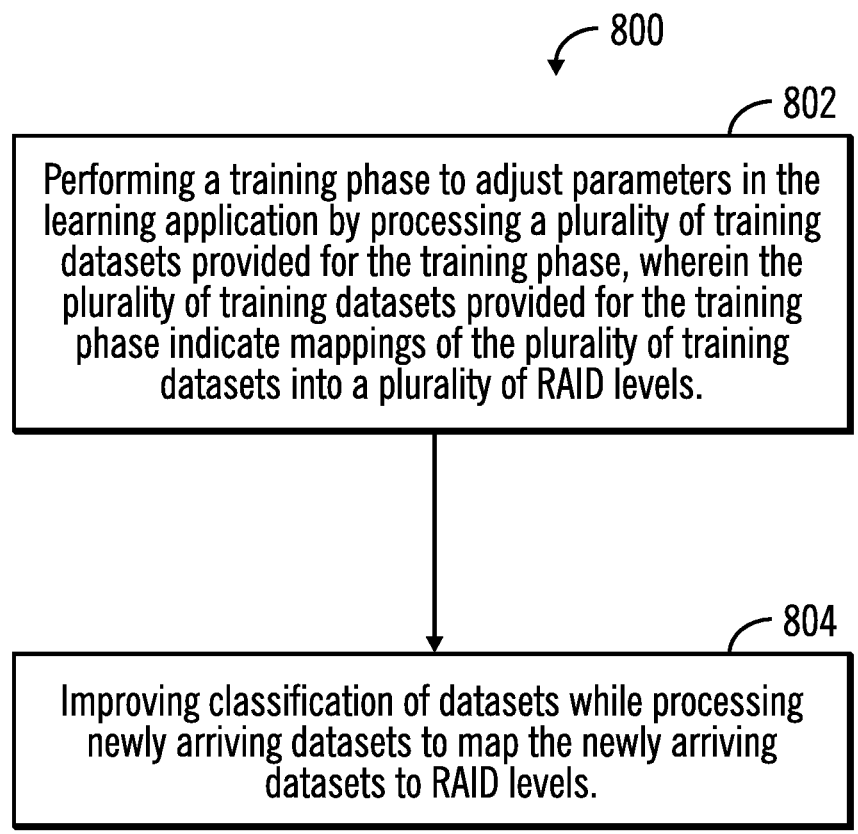
FIG. 8 illustrates a flowchart that shows additional operations for the determination of RAID level for the storage of datasets, in accordance with certain embodiments.

FIG. 8 illustrates a flowchart 800 that shows additional operations for the determination of RAID level for the storage of datasets, in accordance with certain embodiments. The operations shown in FIG. 8 may be performed in the storage controller 102.

Control starts at block 802 in which the learning application 122 is trained in a training phase to adjust parameters in the learning application 122 by processing a plurality of training datasets 402, 404 (or training datasets 604) provided for the training phase, where the plurality of training datasets 402, 404 provided for the training phase indicate mappings of the plurality of training datasets into a plurality of RAID levels.

From block 802 control proceeds to block 804 in which the learning application 122 improves the classification of datasets while processing newly arriving datasets to map the newly arriving datasets to RAID levels.

Therefore FIG. 1-8 illustrate certain embodiments for writing datasets received by a storage controller to RAID arrays of a RAID levels corresponding to the desired fault tolerance need of the datasets by utilizing a learning application.

Further Embodiments

Multiple RAID configuration: The most basic disk configuration for certain embodiments is a bunch of disks grouped together in Just a Bunch of Disks (JBOD) configuration. Since JBOD does not implement any mechanism to add value to the data that is being stored, it is used just to use the disks as if they were a large storage pool. In addition to the JBOD, special structures are used to emulate different RAID configurations. For example, to emulate RAID 5, each WRITE operation is striped among different disks and the parity for each stripe is also calculated and stored in a different disk. The same group of disks may also be used to contain a RAID 10 structure in which each WRITE operation will be striped and mirrored. Additional metadata may be maintained in order to store the necessary information to run the emulation of each RAID type.

Data Collection (i.e., dataset collection): Usage patterns may be tracked across the array; this is not completely dependent upon the time of last read or write but may also depend on consistency of use (e.g. is the data used once a year?). The value of the data may be set by the user and may be provided with the data. Overall data hierarchy and details may be tracked.

Machine Learning Functions: User data "label" may correspond to the RAID type associated to such data type. All similar user data streams are made to fall into the same category. Characteristics such as the user data itself, the frequency of reads and writes, the other data types associated with an I/O operation of this type (for example, when a certain block is read, this other sequence of blocks are typically read as well, etc.) are taken into account for the data type identification operation.

Array Updates: The user may also place value to certain types if data, if they vary from the default. The storage controller will take this into account when writing the data. For example, video files may be considered high value to one user, and low value to another user. Certain embodiments allow each user to set the user's individual preferences. The value of the data may be used to prioritize the queued write data. The high value data written first, with the lowest valued data written last.

Analytics collected for data categorization: Historical data (of WRITES) is kept in order to be able to run analytics and train a machine learning mechanism that may be used later to categorize new incoming data. The user may optionally categorize the data to help tune the mechanisms so that additional data that is similar to the one previously categorized is sent to the appropriate RAID.

Another option is to run a clustering algorithm first to generate labels and then let the system receive new data and categorize it according to the clusters the system generated in the first place.

A machine learning algorithm with a short learning time is preferred in this case, given that it is desirable to allow the algorithm to keep learning after the initial training cycle to make the data categorization more accurate over the time.

Certain embodiments do not replace traditional tiering technologies but complement them. If a particular set of blocks were written to the incorrect RAID (because the Bayesian model is not yet accurate enough) then the traditional tiering technology will perform a post-processing operation to move the data to its final destination. This movement may trigger a new learning cycle for the Bayesian classifier and over time there will be more positive hits made by the Bayesian classifier while less hits made by the traditional tiering technology will be observed.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 9:
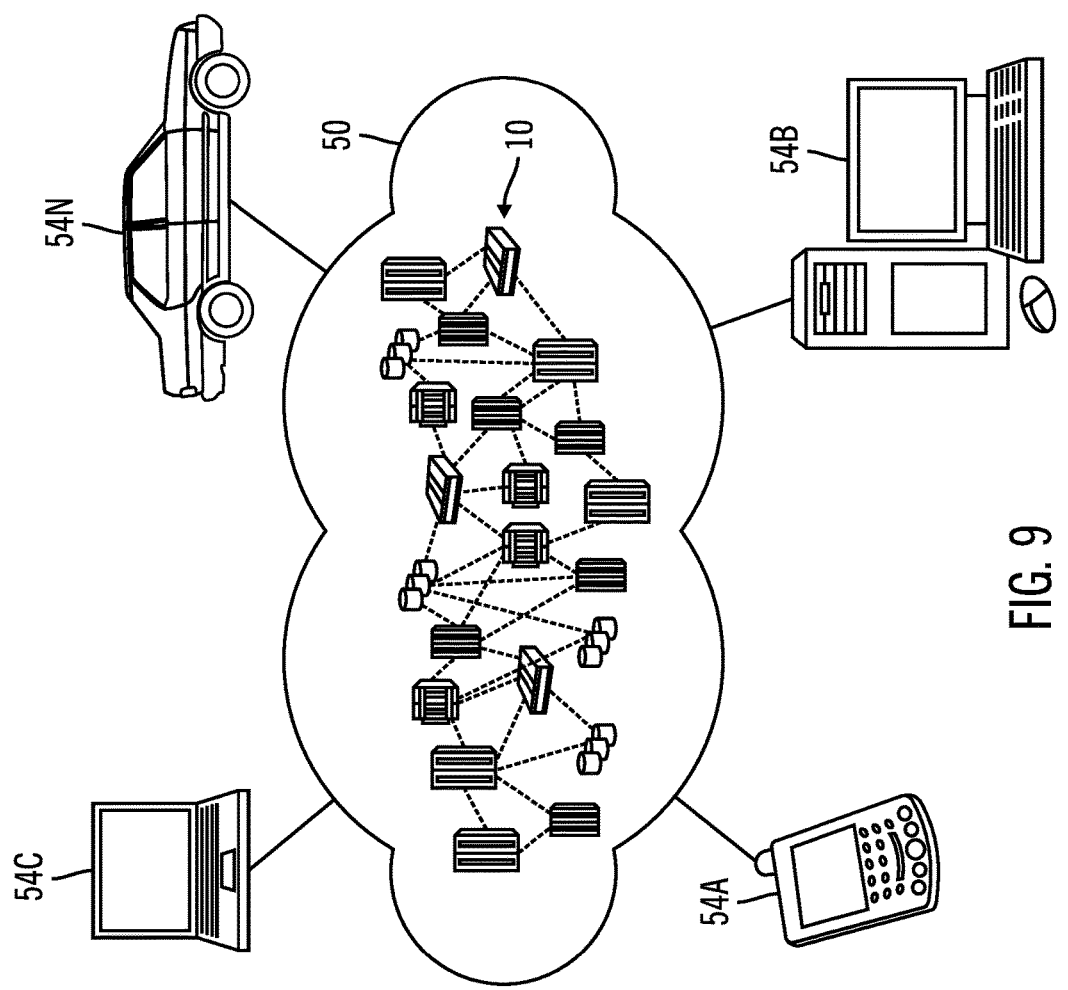
FIG. 9 illustrates a block diagram of a cloud computing environment, in accordance with certain embodiments.

Referring now to FIG. 9, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer MC, and/or automobile computer system MN may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
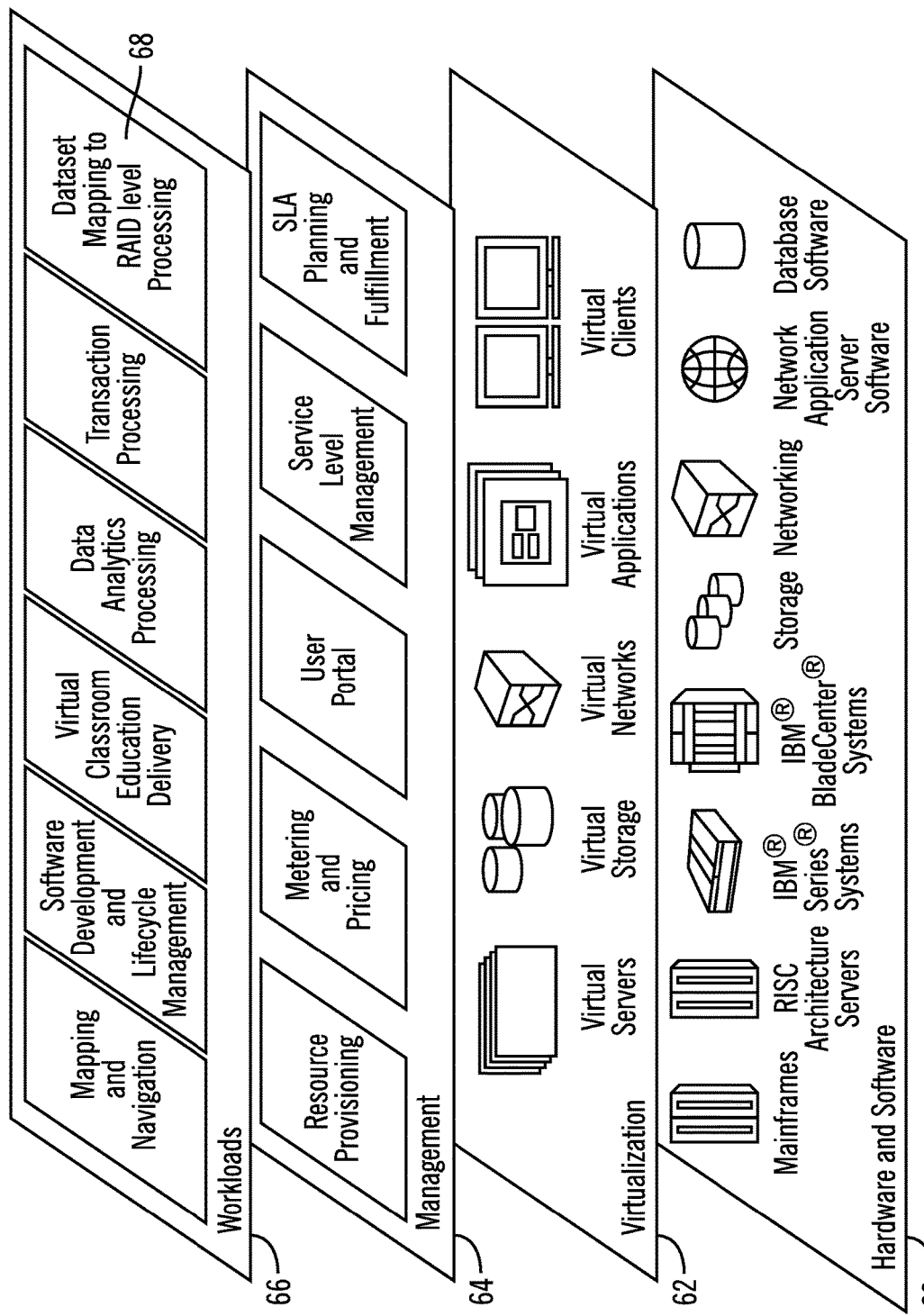
FIG. 10 illustrates a block diagram of further details of the cloud computing environment of FIG. 9, in accordance with certain embodiments.

Referring now to FIG. 10 a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, z/OS, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and dataset mapping to RAID level processing 68 as shown in FIGS. 1-10.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 11:
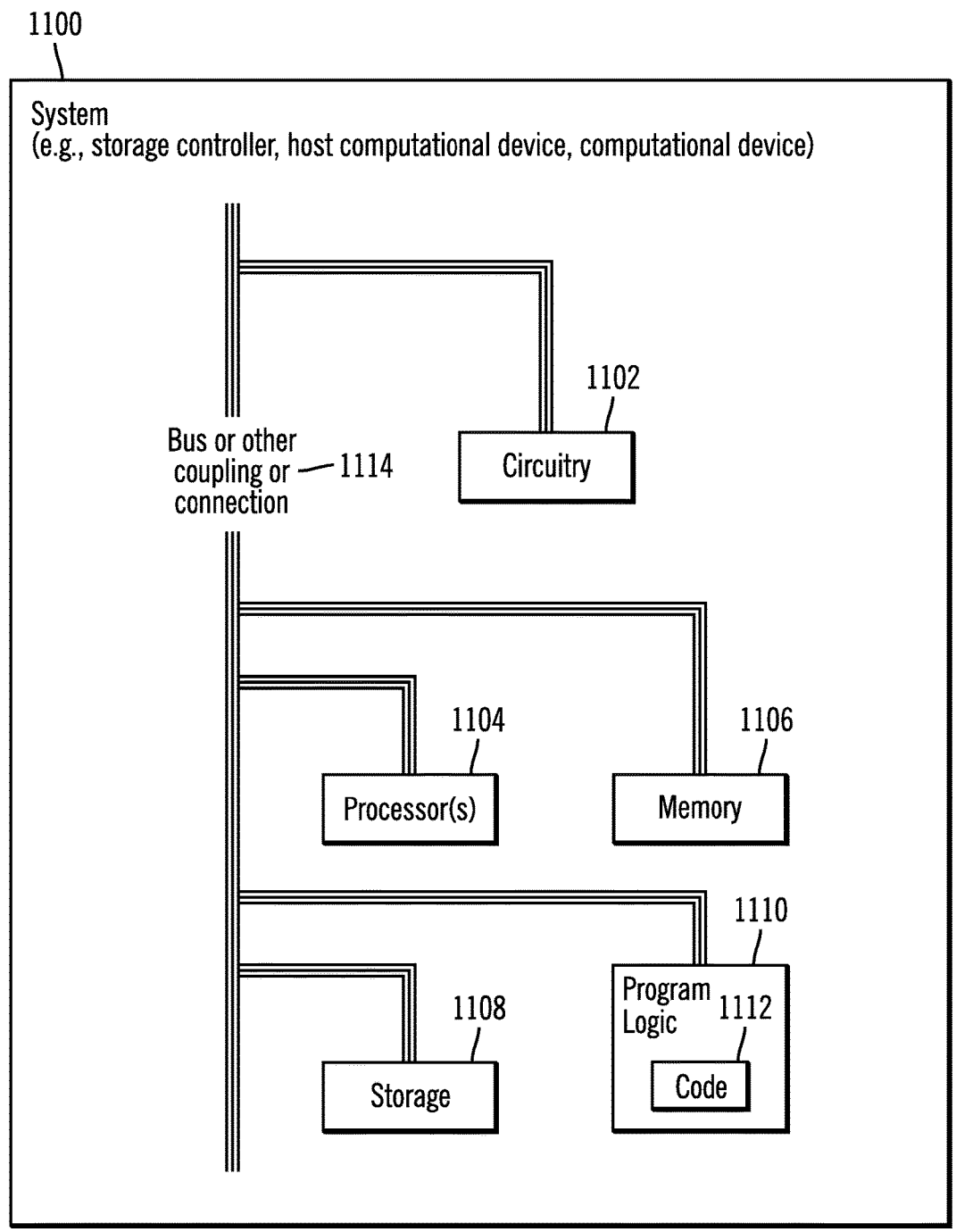
FIG. 11 illustrates a block diagram of a computational system that shows certain elements that may be included in the storage controller, and/or the host computational devices, as described in FIGS. 1-10, in accordance with certain embodiments.

FIG. 11 illustrates a block diagram that shows certain elements that may be included in the storage controller 102, and the host computational devices 104, 106 or other computational devices in accordance with certain embodiments. The system 1100 may include a circuitry 1102 that may in certain embodiments include at least a processor 1104. The system 1100 may also include a memory 1106 (e.g., a volatile memory device), and storage 1108. The storage 1108 may include a non-volatile memory device (e.g., EEPROM, ROM, PROM, flash, firmware, programmable logic, etc.), magnetic disk drive, optical disk drive, tape drive, etc. The storage 1108 may comprise an internal storage device, an attached storage device and/or a network accessible storage device. The system 1100 may include a program logic 1110 including code 1112 that may be loaded into the memory 1106 and executed by the processor 1104 or circuitry 1102. In certain embodiments, the program logic 1110 including code 1112 may be stored in the storage 1108. In certain other embodiments, the program logic 1110 may be implemented in the circuitry 1102. One or more of the components in the system 1100 may communicate via a bus or via other coupling or connection 1114. Therefore, while FIG. 11 shows the program logic 1110 separately from the other elements, the program logic 1110 may be implemented in the memory 1106 and/or the circuitry 1102.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
receiving, by a storage controller, a write command from a host computational device to write a dataset;
mapping, by a learning application, the dataset into a Redundant Array of Independent Disk (RAID) level by classifying the dataset into a category of a plurality of categories, wherein the plurality of categories correspond to a plurality of RAID levels; and
writing by a storage management application, the dataset to a RAID array that corresponds to the RAID level determined by the learning application, wherein a tiering application that executes in the storage controller moves the dataset from one storage tier to another storage tier overriding a previous classification of the dataset made by the learning application, and wherein the learning application maps the dataset into the RAID level based on indications corresponding to:
an initiator indication that indicates the host computational device from which a request to write the dataset was received by the storage controller;
a block size indication that indicates a size in blocks of the dataset; and
a timestamp indication that indicates a time at which each dataset was generated.

2. The method of claim 1, wherein the learning application performs operations comprising:
performing a training phase to adjust parameters in the learning application by processing a plurality of training datasets provided for the training phase, wherein the plurality of training datasets provided for the training phase indicate mappings of the plurality of training datasets into a plurality of RAID levels; and
improving classification of datasets while processing newly arriving datasets to map the newly arriving datasets to RAID levels.

3. The method of claim 2, wherein the learning application interfaces with the tiering application to adjust the classification of datasets, in response to the tiering application moving one or more datasets from one storage tier to another storage tier.

4. The method of claim 3, wherein the mapping of the dataset into the RAID level is based on fault tolerance requirements and performance requirements of the dataset.

5. The method of claim 1, wherein a first dataset that requires a higher level of fault tolerance than a second dataset is mapped into a RAID level that provides a higher level of fault tolerance in comparison to a RAID level to which the second dataset is mapped into.

6. The method of claim 1, wherein the classifying of the dataset to a selected RAID level is based on determining that a probability of the dataset being of the selected RAID level is equal to a multiplication of probabilities of the selected RAID level multiplied by the probability of an incoming initiator indication given that the selected RAID has happened, multiplied by the probability of the block size indication being obtained given that the selected RAID has happened, multiplied by the probability of the timestamp indication given that the selected RAID has happened.

7. The method of claim 1, wherein if the dataset is written to an incorrect RAID level by the learning application then the tiering application moves the dataset to a correct RAID level to trigger a new learning cycle for classifying the dataset.

8. A system, comprising:
a memory; and
a processor coupled to the memory, wherein the processor performs operations, the operations performed by the processor comprising:
receiving a write command from a host computational device to write a dataset;
mapping, by a learning application, the dataset into a Redundant Array of Independent Disk (RAID) level by classifying the dataset into a category of a plurality of categories, wherein the plurality of categories correspond to a plurality of RAID levels; and
writing by a storage management application, the dataset to a RAID array that corresponds to the RAID level determined by the learning application, wherein a tiering application that executes in the system moves the dataset from one storage tier to another storage tier overriding a previous classification of the dataset made by the learning application, and wherein the learning application maps the dataset into the RAID level based on indications corresponding to:
an initiator indication that indicates the host computational device from which a request to write the dataset was received by the system;
a block size indication that indicates a size in blocks of the dataset; and
a timestamp indication that indicates a time at which each dataset was generated.

9. The system of claim 8, wherein the learning application performs operations comprising:
performing a training phase to adjust parameters in the learning application by processing a plurality of training datasets provided for the training phase, wherein the plurality of training datasets provided for the training phase indicate mappings of the plurality of training datasets into a plurality of RAID levels; and
improving classification of datasets while processing newly arriving datasets to map the newly arriving datasets to RAID levels.

10. The system of claim 9, wherein the learning application interfaces with the tiering application to adjust the classification of datasets, in response to the tiering application moving one or more datasets from one storage tier to another storage tier.

11. The system of claim 10, wherein the mapping of the dataset into the RAID level is based on fault tolerance requirements and performance requirements of the dataset.

12. The system of claim 8, wherein a first dataset that requires a higher level of fault tolerance than a second dataset is mapped into a RAID level that provides a higher level of fault tolerance in comparison to a RAID level to which the second dataset is mapped into.

13. The system of claim 8, wherein the classifying of the dataset to a selected RAID level is based on determining that a probability of the dataset being of the selected RAID level is equal to a multiplication of probabilities of the selected RAID level multiplied by the probability of an incoming initiator indication given that the selected RAID has happened, multiplied by the probability of the block size indication being obtained given that the selected RAID has happened, multiplied by the probability of the timestamp indication given that the selected RAID has happened.

14. The system of claim 8, wherein if the dataset is written to an incorrect RAID level by the learning application then the tiering application moves the dataset to a correct RAID level to trigger a new learning cycle for classifying the dataset.

15. A computer program product, the computer program product comprising a computer readable storage medium having computer readable program code embodied therewith, the computer readable program code configured to perform operations on a storage controller, the operations comprising:
receiving, by the storage controller, a write command from a host computational device to write a dataset;
mapping, by a learning application, the dataset into a Redundant Array of Independent Disk (RAID) level by classifying the dataset into a category of a plurality of categories, wherein the plurality of categories correspond to a plurality of RAID levels; and
writing by a storage management application, the dataset to a RAID array that corresponds to the RAID level determined by the learning application, wherein a tiering application that executes in the storage controller moves the dataset from one storage tier to another storage tier overriding a previous classification of the dataset made by the learning application, and wherein the learning application maps the dataset into the RAID level based on indications corresponding to:
an initiator indication that indicates the host computational device from which a request to write the dataset was received by the storage controller;
a block size indication that indicates a size in blocks of the dataset; and
a timestamp indication that indicates a time at which each dataset was generated.

16. The computer program product of claim 15, wherein the learning application performs operations comprising:
performing a training phase to adjust parameters in the learning application by processing a plurality of training datasets provided for the training phase, wherein the plurality of training datasets provided for the training phase indicate mappings of the plurality of training datasets into a plurality of RAID levels; and
improving classification of datasets while processing newly arriving datasets to map the newly arriving datasets to RAID levels.

17. The computer program product of claim 16, wherein the learning application interfaces with the tiering application to adjust the classification of datasets, in response to the tiering application moving one or more datasets from one storage tier to another storage tier.

18. The computer program product of claim 17, wherein the mapping of the dataset into the RAID level is based on fault tolerance requirements and performance requirements of the dataset.

19. The computer program product of claim 15, wherein the classifying of the dataset to a selected RAID level is based on determining that a probability of the dataset being of the selected RAID level is equal to a multiplication of probabilities of the selected RAID level multiplied by the probability of an incoming initiator indication given that the selected RAID has happened, multiplied by the probability of the block size indication being obtained given that the selected RAID has happened, multiplied by the probability of the timestamp indication given that the selected RAID has happened.

20. The computer program product of claim 15, wherein if the dataset is written to an incorrect RAID level by the learning application then the tiering application moves the dataset to a correct RAID level to trigger a new learning cycle for classifying the dataset.

\* \* \* \* \*